BEST AVAILABLE COPY

M. HANFORD.

Improvement in Elevators.

No. 4,751.

Reissued Feb. 13, 1872.

Witnesses.

Waldo E. Boardman

James H. Fenning

M. Hanford, by his Attorney

Frederick Curtis.

BEST AVAILABLE COPY

UNITED STATES PATENT OFFICE.

MELANCTHON HANFORD, OF BOSTON, MASSACHUSETTS.

IMPROVEMENT IN ELEVATORS.

Specification forming part of Letters Patent No. 99,433, dated February 1, 1870; reissue No. 4,751, dated February 13, 1872.

*To all to whom these presents shall come:*

Be it known that I, MELANCTHON HANFORD, of Boston, in the county of Suffolk and Commonwealth of Massachusetts, have made an invention of a new and useful Elevator for Hoisting Goods or Articles of Various Kinds; and do hereby declare the following to be a full, clear, and exact description thereof, due reference being had to the accompanying drawing making part of this specification, and in which—

Figure 1:
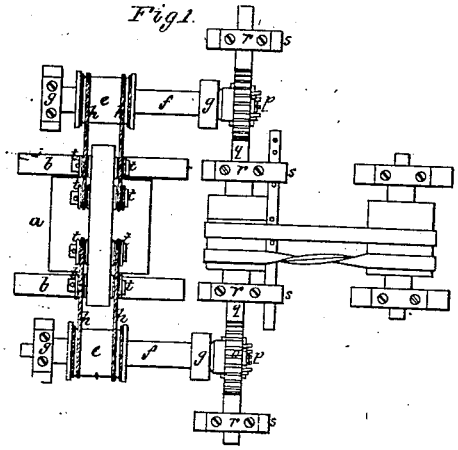
Figure 2:
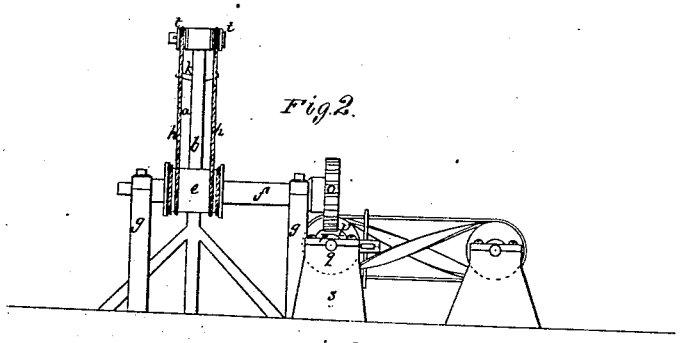
Figure 3:
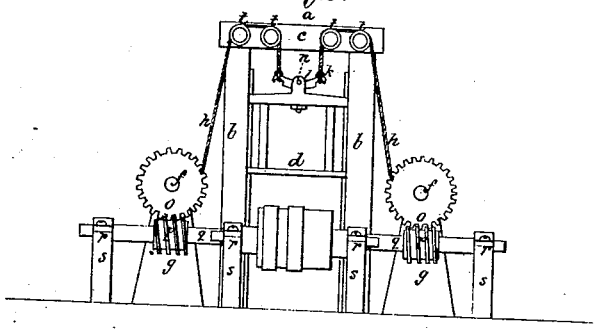

Figure 1 is a plan, and Figs. 2 and 3 side elevations of my invention.

My present improvements relate to a class of elevators for hoisting human beings, merchandise, &c., by the use of one or more ropes or suspensories wound about one or more drums, the actuating power of the drums being two or more worms and worm-gears, the threads of the worm being arranged in opposite directions, and the threads of the gears into which they respectively mesh being correspondingly formed. My invention may be stated to consist, first, in the combination, with the elevator-carriage, of two or more screws or worms applied to one common shaft, a part being left and the other right threaded, and operating in connection with worm-gears having corresponding pitches to actuate the hoisting mechanism, when the said worm or screw shaft is independent of the carriage, and is stationary or does not move therewith. Heretofore all the hoisting mechanism, including the gears, shafts, &c., have been mounted upon and carried by the carriage, and all this weight it has been necessary to elevate with the carriage, with, of course, an expenditure of considerable power. Under my invention this machinery may be located on the ground floor, entirely independent of the carriage, and I thereby effect a great saving in the power required to elevate the latter; and this invention further consists in the employment, when desirable, of two oppositely-disposed drums or sets of drums, operated by screws or worms, to coil up or deliver the suspensories at equal rates, in order to obtain an ease of power and relieve the mechanism of the elevator in general from the one-sided strain which otherwise devolves upon it.

In describing the nature and construction of the invention I have adopted, in the present instance, an elevator in which the carriage thereof is raised and lowered by two ropes, each wound upon and delivered from a drum of equal capacity, each drum being mounted upon a shaft carrying a worm-gear, which meshes into one of two worms affixed to and revolving with a shaft common to the two, the screws being of equal pitch, but the pitch of the one sloping in a direction opposite to that of the other.

In the drawing above referred to as accompanying this specification and which illustrates my invention, *a* denotes an upright frame, composed of two side posts or guides, *b b*, and a transverse bar or head, *c*, the former serving as guides to the hoisting carriage or platform, shown at *d*, these parts being constructed and disposed after the manner of many elevators now in use. In carrying out my invention, I dispose, preferably upon opposite sides of the frame *a*, two revolving drums, *e e*, which are mounted upon shafts *f f* supported in suitable standards *g g*, two hoisting-ropes, *h h*, being confined at one end to each drum, and having their opposite ends carried about suitable rollers, *t t t*, &c., and secured to opposite ends of one of two lateral bars, *k k*, such bars, at their centers, being swiveled to an oscillating cross-head, *l*, pivoted at its center to the central line of draft of the upper cross-bar *m* of the carriage *d*, as shown at *n*. To the inner extremity of each shaft *f*, and in front of its standard, I affix a worm-gear, *o*, while below each worm-gear, and meshing into it, I dispose a revolving worm, *p*, the two worms *p* being, in turn, mounted upon a long horizontal shaft, *q*, the ends of such shaft being mounted and revolving in boxes *r r* suitably fixed to standards *s s*, erected in the immediate vicinity of the standard *g'*, and so that the shaft *q* shall stand at right angles to the shafts *f f*, it being observed that the worms are right and left worms, by which means the gears and drums are rotated in opposite directions. The shaft *q* is to be provided with reversible fast pulleys and a loose pulley and belts in manner well understood by mechanics, by which the direction of rotation of the shaft may be reversed, and the elevator-carriage raised or lowered, or its movements arrested at pleasure.

The revolution of the shaft, by means of its worms, as will be at once understood, will revolve the gears *p p*, and, by winding the ropes upon the drums, elevate or lower the carriage, as the case may be, according to the direction in which they travel.

To obtain symmetry of parts and uniformity in action, I prefer that the two sets of drums, screws, worm-gears, &c., should be counterparts of each other in form and disposition, as herein shown. This arrangement, however, though desirable, is not arbitrary, as I should otherwise obtain similar results, provided each drum was driven at the same peripheral rapidity.

The arrangement of the right and left worms, taken in connection with the hoisting-drums and their gears, secures the following important advantages: One advantage of such dually-arranged worms and gears, in addition to the increased bearing-surface of screw-threads and gear-teeth obtained, will be seen in the additional means of safety they afford, since, if one of such worms or gears should fail, its fellow will be left to perform, to a certain extent, the duty of both, and to effectually prevent accident. As the strain and power necessary to elevate the load are distributed between two worms, the wear upon each is reduced in comparison with the employment of one, while, as the strain exerted upon them, whether from the weight of the load in one direction or the power applied to the shaft in the other, is exerted in contrary directions, and with equal force upon each, the end thrust upon the shaft is avoided, as before stated. By the act of equalizing the strain and pressure upon the elevator-carriage and its frame, by the arrangement of the duplicate drums and right and left worms, I reduce the amount of power required to drive the same.

*Claims.*

1. The combination, with the carriage of an elevator, of two or more screws or worms applied to one common shaft supported in stationary bearings, unattached to and not moving with the said carriage, a portion of the worms being right and a portion left threaded to operate in connection with worm-gears of corresponding pitches to actuate the hoisting mechanism, substantially as herein shown and described.

2. In mechanism for operating elevator-carriages, the employment of two or more oppositely-arranged drums, provided each with one or more hoisting-ropes or suspensories, and actuated by worms and worm-gears or their equivalents, for purposes stated.

3. The general arrangement and combination of the carriage *d* and its frame, the drums *e e*, mounted and provided with the gears *o o*, as explained, and the worms *p p* mounted upon the shaft *q*, the latter being provided with reversible fast pulleys, and with a loose pulley and belts, and the whole arranged and operating as hereinbefore set forth.

MELANCTHON HANFORD.

Witnesses:

W. E. BOARDMAN,
FRED. CURTIS.